US009772463B2

United States Patent
Budd et al.

(10) Patent No.: US 9,772,463 B2
(45) Date of Patent: Sep. 26, 2017

(54) INTRA CHIP OPTICAL INTERCONNECT STRUCTURE

(71) Applicant: International Business Machines Corporation, Armonk, NY (US)

(72) Inventors: Russell A. Budd, North Salem, NY (US); Effendi Leobandung, Stormville, NY (US); Ning Li, White Plains, NY (US); Jean-Olivier Plouchart, New York, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/477,328

(22) Filed: Sep. 4, 2014

(65) Prior Publication Data

US 2016/0070078 A1    Mar. 10, 2016

(51) Int. Cl.
*G02B 6/43* (2006.01)
(52) U.S. Cl.
CPC ..................................... *G02B 6/43* (2013.01)
(58) Field of Classification Search
CPC ... G02B 6/34; G02B 6/10; G02B 6/43; G02B 6/4295; G02B 6/132; G02B 6/136; G02B 6/42
See application file for complete search history.

(56) References Cited

U.S. PATENT DOCUMENTS 8,257,990 B2    9/2012   Koch
8,319,237 B2    11/2012  Liu
8,428,404 B1    4/2013   Shubin et al.
8,435,809 B2    5/2013   Heck et al.
8,548,287 B2    10/2013  Thacker et al.
(Continued)

FOREIGN PATENT DOCUMENTS

EP    0763757 A2       3/1997
WO    WO2008058099    5/2008
WO    WO2013095866    6/2013

OTHER PUBLICATIONS

Fedeli, J.M. et al., "Development of Silicon Photonics Devices Using Microelectronic Tools for the Integration on Top of a CMOS Wafer", Advances in Optical Technologies, Mar. 2008, vol. 2008, 15 pages.

(Continued)

*Primary Examiner* — Fernando L Toledo
*Assistant Examiner* — Lawrence-Linh T Nguyen
(74) *Attorney, Agent, or Firm* — Scully, Scott, Murphy & Presser, P.C.; Louis J. Percello, Esq.

(57) ABSTRACT

An optical interconnect is located on a surface of a semiconductor handle substrate. The optical interconnect includes a waveguide core material portion that is completely surrounded on all four sides by a dielectric oxide-containing cladding structure. The dielectric oxide-containing material of the dielectric oxide-containing cladding structure that is located laterally adjacent end segments of the waveguide core material portion is configured to include a sidewall surface that can receive and transmit light. A plurality of semiconductor devices can be formed above the topmost dielectric oxide-containing material of the dielectric oxide-containing cladding structure.

20 Claims, 7 Drawing Sheets

(56) References Cited

U.S. PATENT DOCUMENTS

| | | | |
|---|---|---|---|
| 2004/0190826 A1* | 9/2004 | Ghiron | G02B 6/4206 385/36 |
| 2006/0126993 A1 | 6/2006 | Piede et al. | |
| 2007/0140619 A1* | 6/2007 | Cohen | G02B 6/124 385/37 |
| 2007/0253663 A1* | 11/2007 | Keyser | G02B 6/12 385/36 |
| 2007/0274655 A1* | 11/2007 | Keyser | G02B 6/12 385/131 |

OTHER PUBLICATIONS

Baak, T., "Silicon oxynitride; a material for GRIN optics", Applied Optics, Mar. 15, 1982, pp. 1069-1072, vol. 21, No. 6.
Cunningham, J.E., et al., "Aligning Chips Face-to-Face for Dense Capacitive and Optical Communication", IEEE Transactions on Advanced Packaging, May 2010, pp. 289-397, vol. 33, No. 2.

\* cited by examiner

INTRA CHIP OPTICAL INTERCONNECT STRUCTURE

BACKGROUND

The present application relates to a semiconductor structure and a method of forming the same. More particularly, the present application relates to an optical interconnect that includes a waveguide core material portion that is completely surrounded by a dielectric oxide-containing cladding structure which includes dielectric oxide-containing end portions that have sidewall surfaces that are configured to receive and transmit light.

The semiconductor industry has been driven by Moore's law, with transistors per chip (and thus computational power per dollar) roughly doubling every year. However, limitations are being approached that fall beyond the transistor design. For example, interconnect bandwith, e.g., for I/O and clock distribution, is one major source of uncertainty for higher performance computer systems. The reason for this is that electrical interconnects do not scale at the same rate as transistors as their dimensions are shrunk, resulting in a decrease in the reach for faster interconnects.

Optical interconnects have been proposed as an alternative for copper-based interconnects for both on-chip and off-chip applications. Notably, optical interconnects can offer significant advantages over electrical circuitry in the field of advanced microelectronics. One possible implementation of an optical interconnect is based on silicon-on-insulator (SOI) technology, in which optical waveguides are formed on the same thin silicon layer as other complimentary-metal-oxide-semiconductor (CMOS) circuit elements (e.g., field effect transistors (FETs), capacitors, resistors, etc.). Light sources produce optical signals (e.g., light pulses) that propagate in these optical waveguides. Photodetectors convert the optical signals into electrical signals.

Despite the development of optical interconnects that are based on silicon-on-insulator (SOI) technology, there is need to provide an alternative optical interconnect that can be used as a replacement for copper-based interconnects.

SUMMARY

An optical interconnect is located on a surface of a semiconductor handle substrate. The optical interconnect includes a waveguide core material portion that is completely surrounded on all four sides by a dielectric oxide-containing cladding structure. The dielectric oxide-containing material of the dielectric oxide-containing cladding structure that is located laterally adjacent end segments of the waveguide core material portion is configured to include a sidewall surface that can receive and transmit light. A plurality of semiconductor devices can be formed above the topmost dielectric oxide-containing material of the dielectric oxide-containing cladding structure.

In one aspect of the present application, a semiconductor structure is provided. The semiconductor structure of the present application includes an optical interconnect located on a surface of a semiconductor handle substrate. The optical interconnect of the present application includes a base oxide structure containing a first oxide end portion of a first thickness, a second oxide end portion of the first thickness and a middle oxide portion of a second thickness that is less than the first thickness and connecting the first oxide end portion to the second oxide end portion, wherein each of the first oxide end portion and the second oxide end portion has a sidewall surface that is configured to receive and transmit light; a waveguide core material portion having a first pair of parallel sidewall surfaces and a second pair of parallel sidewall surfaces that lie perpendicular to the first pair of parallel sidewall surfaces, wherein one of the first pair of parallel sidewall surfaces of the waveguide core material portion is in direct physical contact with the sidewall surface of the first oxide end portion that is configured to receive and transmit light, and the other of the first pair of parallel sidewall surfaces of the waveguide core material portion is in direct physical contact with the sidewall surface of the second oxide end portion that is configured to receive and transmit light; and an oxide capping layer on an exposed topmost surface of each of the first oxide end portion and the second oxide end portion, on an exposed topmost surface of the waveguide core material portion, and laterally adjacent the second pair of parallel sidewall surfaces of the waveguide core material portion. The semiconductor structure also includes a plurality of semiconductor devices located above a topmost surface of the oxide capping layer of the optical interconnect.

In another aspect of the present application, a method of forming a semiconductor structure is provided. The method includes providing a base oxide structure on a topmost surface of a semiconductor handle substrate. The base oxide structure comprises a first oxide end portion of a first thickness, a second oxide end portion of the first thickness and a middle oxide portion of a second thickness that is less than the first thickness and connecting the first oxide end portion to the second oxide end portion, wherein each of the first oxide end portion and the second oxide end portion has a sidewall surface that is configured to receive and transmit light. Next, a waveguide core material portion is formed on the middle oxide portion of the base oxide structure. The waveguide core material portion has a first pair of parallel sidewall surfaces and a second pair of parallel sidewall surfaces that lie perpendicular to the first pair of parallel sidewall surfaces, wherein one of the first pair of parallel sidewall surfaces of the waveguide core material portion is in direct physical contact with the sidewall surface of the first oxide end portion that is configured to receive and transmit light, and the other of the first pair of parallel sidewall surfaces of the waveguide core material portion is in direct physical contact with the sidewall surface of the second oxide end portion that is configured to receive and transmit light. An oxide capping layer is formed on an exposed topmost surface of each of the first oxide end portion and the second oxide end portion, on an exposed topmost surface of the waveguide core material portion, and laterally adjacent the second pair of parallel sidewall surfaces of the waveguide core material portion.

DETAILED DESCRIPTION

Figure 1:
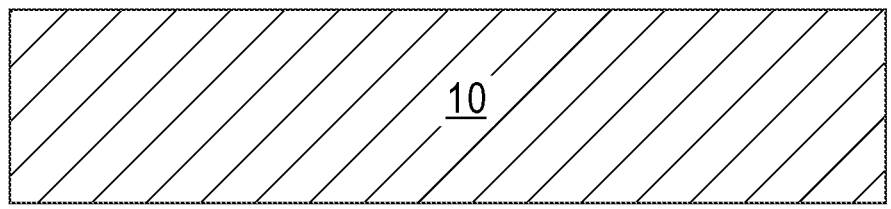
FIG. 1 is a cross sectional view of an exemplary semiconductor structure including a semiconductor handle substrate that can be employed in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements in the various embodiments of the present application are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Referring first to FIG. 1, there is illustrated an exemplary semiconductor structure that can be employed in accordance with an embodiment of the present application. Specifically, FIG. 1 illustrates a semiconductor handle substrate 10. In one embodiment of the present application, the semiconductor handle substrate 10 is a bulk semiconductor substrate. The term "bulk" as used in conjunction with the phrase "semiconductor substrate" denotes that the entire substrate is comprised of at least one semiconductor material.

In one embodiment of the present application, the semiconductor handle substrate 10 can be comprised of a single semiconductor material including, but not limited to, Si, Ge, SiGe, SiC, SiGeC, III/V compound semiconductors such as, for example, InAs, GaAs, and InP, and II/VI compound semiconductor. In another embodiment, the semiconductor handle substrate 10 can be comprised of two or more of the aforementioned semiconductor materials.

In one embodiment, at least a topmost surface of the semiconductor handle substrate 10 can be comprised of a single crystalline semiconductor material, such as, for example, single crystalline silicon or single crystalline germanium. In other embodiments, at least the topmost surface of the semiconductor handle substrate 10 can be comprised of a polycrystalline or an amorphous semiconductor material. The crystal orientation of the semiconductor handle substrate 10 may be {100}, {110}, or {111}. Other crystallographic orientations besides those specifically mentioned can also be used in the present application.

Figure 2:
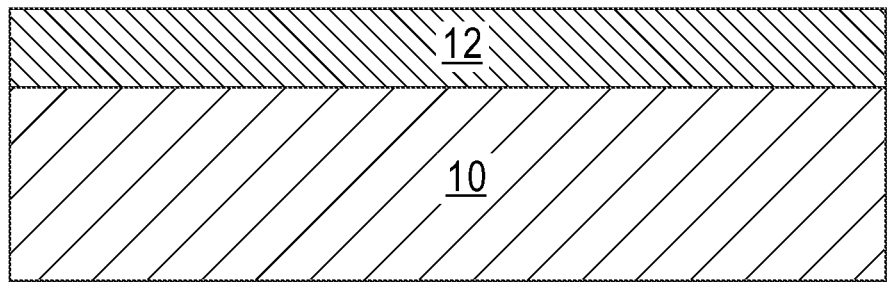
FIG. 2 is a cross sectional view of the exemplary semiconductor structure of FIG. 1 after forming a contiguous oxide layer on an exposed surface of the semiconductor handle substrate.

Referring now to FIG. 2, there is illustrated the exemplary semiconductor structure of FIG. 1 after forming a contiguous oxide layer 12 on an exposed surface, i.e., a topmost surface, of the semiconductor handle substrate 10. The term "contiguous" as used throughout the present application denotes that a material layer spans entirely across a surface of an underlying material layer without any breaks or voids in material layer.

The contiguous oxide layer 12 is comprised of a dielectric oxide-containing material. In one embodiment of the present application, the contiguous oxide layer 12 may comprise a semiconductor oxide such as, for example, silicon dioxide and germanium oxide. In another embodiment of the present application, the contiguous oxide layer 12 may comprise a dielectric metal oxide. Examples of dielectric metal oxides that can be used as the dielectric material include $HfO_2$, $ZrO_2$, $La_2O_3$, $Al_2O_3$, $TiO_2$, $SrTiO_3$, $LaAlO_3$, $Y_2O_3$, $HfO_xN_y$, $ZrO_xN_y$, $La_2O_xN_y$, $Al_2O_xN_y$, $TiO_xN_y$, $SrTiO_xN_y$, $LaAlO_xN_y$, $Y_2O_xN_y$, SiON, $SiN_x$, a silicate thereof, and an alloy thereof. Each value of x is independently from 0.5 to 3 and each value of y is independently from 0 to 2. In some embodiments, other dielectric materials with a refractive index smaller than the waveguide core material can be used instead of a dielectric oxide-containing material.

In some embodiments of the present application, the contiguous oxide layer 12 can be formed by a deposition process. Examples of deposition processes that can be used in providing the contiguous oxide layer 12 include, for example, chemical vapor deposition (CVD), plasma enhanced chemical vapor deposition (PECVD), and atomic layer deposition (ALD). In other embodiments, the contiguous oxide layer 12 can be formed by a thermal oxidation process. In yet other embodiments, the contiguous oxide layer 12 can be formed by a combination of a deposition process and thermal oxidation. The thickness of the contiguous oxide layer 12 can range from 1.5 μm to 3.0 μm. The thickness of the contiguous oxide layer 12 depends on what wavelength is being used and confinement of the light in the waveguide.

Figure 3A:
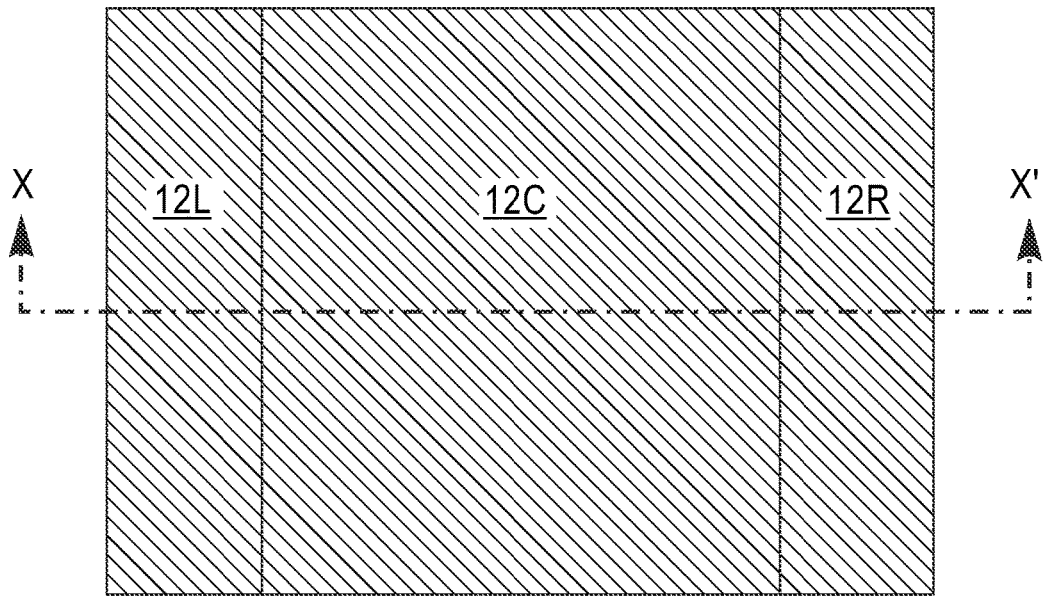
FIG. 3A is a top down view of the exemplary semiconductor structure of FIG. 2 after patterning the contiguous oxide layer to provide a base oxide structure containing a first oxide end portion of a first thickness, a second oxide end portion of the first thickness and a middle oxide portion of a second thickness that is less than the first thickness and connecting the first oxide end portion to the second oxide end portion, wherein each of the first oxide end portion and the second oxide end portion has a sidewall surface that is configured to receive and transmit light.
Figure 3B:
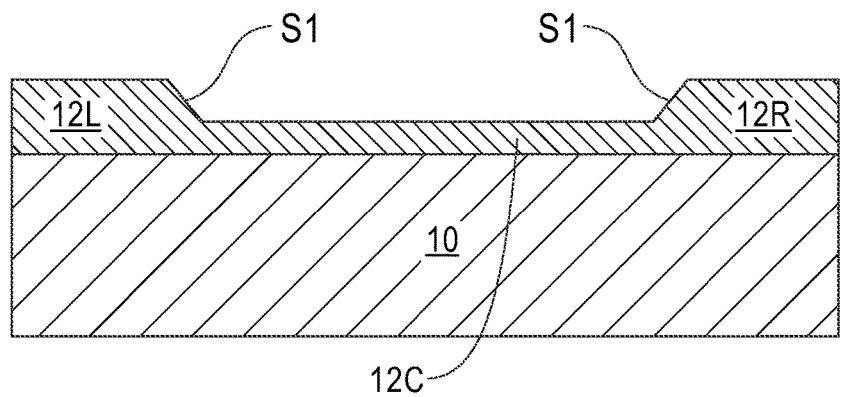
FIG. 3B is a cross sectional view of the exemplary semiconductor structure of FIG. 3A along vertical plane X-X'.

Referring now to FIGS. 3A-3B, there are illustrated the exemplary semiconductor structure of FIG. 2 after patterning the contiguous oxide layer 12 to provide a base oxide structure containing a first oxide end portion 12L of a first thickness, a second oxide end portion 12R of the first thickness and a middle oxide portion 12C of a second thickness that is less than the first thickness and connecting the first oxide end portion 12L to the second oxide end portion 12R. In accordance with the present application each of the first oxide end portion 12L and the second oxide end portion 12R has a sidewall surface S1 that is configured to receive and transmit light.

The patterning process used to form the base oxide structure containing the first oxide end portion 12L, the second oxide end portion 12R and the middle oxide portion 12C may include lithography and etching. Lithography includes forming a photoresist material on the topmost surface of the contiguous oxide layer 12, exposing the photoresist material to a desired pattern of radiation, and developing the exposed photoresist material utilizing a conventional resist developer. An anisotropic or isotropic etch is used to transfer the pattern into the contiguous oxide layer 12 and to provide the base oxide structure containing the first oxide end portion 12L, the second oxide end portion 12R and the middle oxide portion 12C. The angle of 12L and 12R can be adjusted for example by adjusting the photoresist etch mask profile. The photoresist is removed after pattern transfer utilizing a conventional resist stripping process such as, for example, ashing.

The first oxide end portion 12L, the second oxide end portion 12R, and the middle oxide portion 12C that provide the base oxide structure are of unitary construction and comprise a same dielectric oxide-containing material as that of the contiguous oxide layer 12.

As mentioned above, the first oxide end portion 12L and the second oxide end portion 12R each have a first thickness. In accordance with the present application, this first thickness, which is measured from the bottommost surface of the oxide end portion to the corresponding topmost surface of the oxide end portion, is equal to the thickness of the contiguous oxide layer 12. As mentioned above, the middle oxide portion 12C has a second thickness that is less than the first thickness. In one embodiment of the present application, the second thickness of the middle oxide portion 12C is from 0.5 μm to 1 μm. The thickness depends on what wavelength is being used and confinement of the light in the waveguide core material. Since the second thickness of the middle oxide portion 12C is less than the first thickness of the first oxide end portion 12L and the second oxide end portion 12R, the topmost surface of the middle oxide portion 12C is vertically offset and located beneath the topmost surface of each of the first oxide end portion 12L and the second oxide end portion 12R.

As mentioned above, each of the first oxide end portion 12L and the second oxide end portion 12R has a sidewall surface S1 that is configured to receive and transmit light. The sidewall surface S1 of both the first oxide end portion 12L and the second oxide end portion 12R that is configured to receive and transmit light is located above the topmost surface of the middle oxide portion 12C. Thus, the sidewall surface S1 of both the first oxide end portion 12L and the second oxide end portion 12R is exposed at this point of the present application. In one embodiment of the present application, the sidewall surface S1 of both the first oxide end portion 12L and the second oxide end 12R that are configured to receive and transmit light have an angle (as measured from the topmost surface of the first oxide end portion 12L or the second oxide end portion 12R to the topmost surface of the middle oxide portion 12C) that is less than 90°. In another embodiment of the present application, the sidewall surface S1 of both the first oxide end portion 12L and the second oxide end 12R that are configured to receive and transmit light have an angle (as measured from the topmost surface of the first oxide end portion 12L or the second oxide end portion 12R to the topmost surface of the middle oxide portion 12C) from 10° to 80°.

Figure 4A:
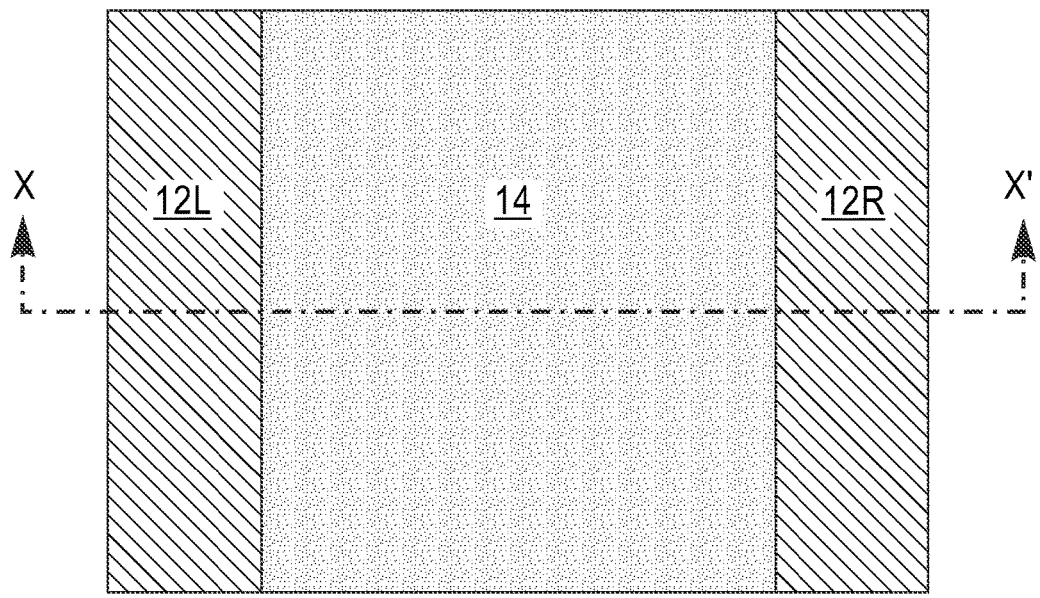
FIG. 4A is a top down view of the exemplary semiconductor structure of FIGS. 3A-3B after forming a waveguide core material layer having a topmost surface that is coplanar with a topmost surface of both the first and second oxide end portions and located directly on an exposed surface of the middle oxide portion.
Figure 4B:
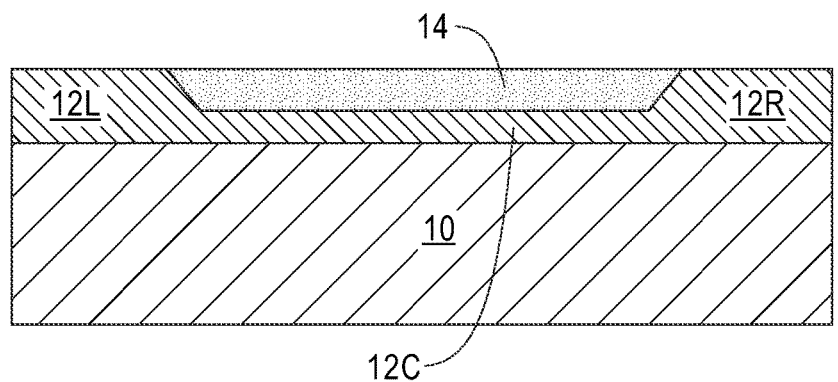
FIG. 4B is a cross sectional view of the exemplary semiconductor structure of FIG. 4A along vertical plane X-X'.

Referring now to FIGS. 4A-4B, there are illustrated the exemplary semiconductor structure of FIGS. 3A-3B after forming a waveguide core material layer 14 having a topmost surface that is coplanar with a topmost surface of both the first and second oxide end portions 12L, 12R and located directly on an exposed surface, i.e., a topmost surface, of the middle oxide portion 12C. The term "waveguide core material layer" is used throughout the present application to denote a material having a higher reflective index and thus light permittivity than the dielectric oxide-containing material that is used in the present application to subsequently surround the waveguide core material portion that is provided by the waveguide core material layer.

As is shown, the waveguide core material layer 14 is formed in an entirety of a space located between the first oxide end portion 12L and the second oxide end portion 12R and above the middle oxide portion 12C created by patterning the contiguous oxide layer 12. As is also shown, the waveguide core material layer 14 that is formed has a topmost surface that is coplanar with a topmost surface of each of the first oxide end portion 12L and the second oxide end portion 12R. As is further shown, a bottommost surface of the waveguide core material layer 14 is in direct physical contact with a topmost surface of the middle oxide portion 12C of the base oxide structure, and sidewall surfaces of the waveguide core material layer 14 are in contact with the sidewall surface S1 that is present in the first oxide end portion 12L and the second oxide end portion 12R.

In one embodiment of the present application, the waveguide core material layer 14 is comprised of amorphous silicon. The term "amorphous" denotes that the silicon that provides the waveguide core material layer 14 lacks any well defined crystal structure. In another embodiment of the present application, the waveguide core material layer 14 is comprised of silicon nitride. In some embodiments, and when silicon nitride is used to provide the waveguide core material layer 14, the silicon nitride may have a silicon concentration of from 50% atomic percent to 80% atomic percent although other percentage is also acceptable.

The waveguide core material layer 14 can be formed by a deposition process including, for example, chemical vapor deposition and plasma enhanced chemical vapor deposition. In some embodiments, and following the deposition of the waveguide core material layer 14, a planarization process such as, for example, chemical mechanical planarization (CMP) and/or grinding can be employed to provide the structure shown in FIGS. 4A-4B.

Figure 5A:
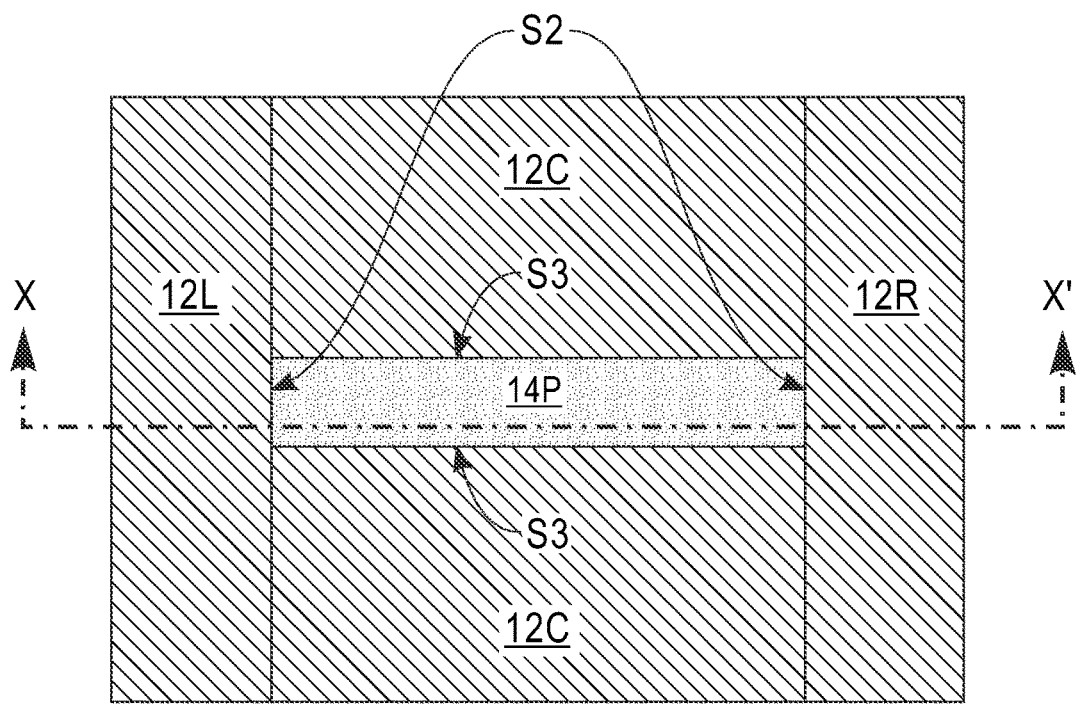
FIG. 5A is a top down view of the exemplary semiconductor structure of FIGS. 4A-4B after patterning the waveguide core material layer to provide a waveguide core material portion having a first pair of parallel sidewall surfaces and a second pair of parallel sidewall surfaces that lie perpendicular to the first pair of parallel sidewall surfaces, wherein one of the first pair of parallel sidewall surfaces of the waveguide core material portion is in direct physical contact with the sidewall surface of the first oxide end portion that is configured to receive and transmit light, and the other of the first pair of parallel sidewall surfaces of the waveguide core material portion is in direct physical contact with the sidewall surface of the second oxide end portion that is configured to receive and transmit light.
Figure 5B:
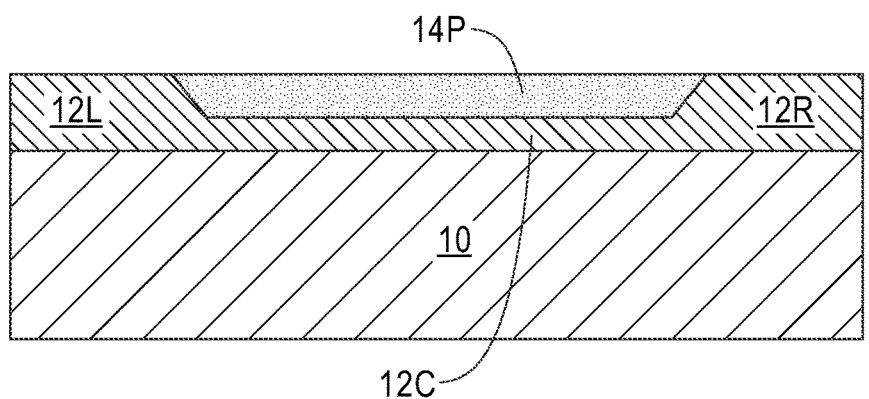
FIG. 5B is a cross sectional view of the exemplary semiconductor structure of FIG. 5A along vertical plane X-X'.

Referring now to FIGS. 5A-5B, there are illustrated the exemplary semiconductor structure of FIGS. 4A-4B after patterning the waveguide core material layer to provide a waveguide core material portion 14P. Although a single waveguide core material portion 14P is described and illustrated as being formed between the first oxide end portion 12L and the second oxide end portion 12R, a plurality of waveguide core material portions can be formed between the first oxide end portion 12L and the second oxide end portion 12R. In such an embodiment, each waveguide core material portion that is located between the first oxide end portion 12L and the second oxide end portion 12R is oriented parallel to each other.

The waveguide core material portion 14p has a first pair of parallel sidewall surfaces S2 and a second pair of parallel sidewall surfaces S3 that lie perpendicular to the first pair of parallel sidewall surfaces S2. In accordance with the present application, one of the first pair of parallel sidewall surfaces S2 of the waveguide core material portion 14P is in direct physical contact with the sidewall surface S1 of the first oxide end portion 12L that is configured to receive and transmit light, and the other of the first pair of parallel sidewall surfaces S2 of the waveguide core material portion 14P is in direct physical contact with the sidewall surface S1 of the second oxide end portion 12R that is configured to receive and transmit light. In accordance with the present application, the second pair of parallel sidewall surfaces S3 of the waveguide core material portion 14P has a length that is greater than a length of the first pair of parallel sidewall surfaces S2 of the waveguide core material portion 14P.

Portions of the topmost surface of the middle oxide portion 12C of the base oxide structure (See, FIG. 5A) as well as the second pair of parallel sidewall surfaces S3 of the waveguide core material portion are now exposed.

The formation of the waveguide core material portion 14P of the present application can be formed by a patterning process. In one embodiment, the patterning process used to provide the waveguide core material portion 14P may include lithography and etching. The lithographic step used in providing the waveguide core material portion 14P is the same as described above in patterning the contiguous oxide layer 12. The etching process used in providing the waveguide core material portion 14P comprises an anisotropic etch.

The second pair of parallel sidewall surfaces S3 of the waveguide core material portion 14P is perpendicular, i.e., S3 are vertical sidewalls, to the topmost surface of the semiconductor handle substrate 10. The first pair of parallel sidewall surfaces S2 of the waveguide core material portion 14P is not perpendicularly oriented to the topmost surface of the semiconductor handle substrate 10 since they are in contact with sidewall surface S1 of the first and second oxide end portions 12L, 12R of the base oxide structure.

Figure 6A:
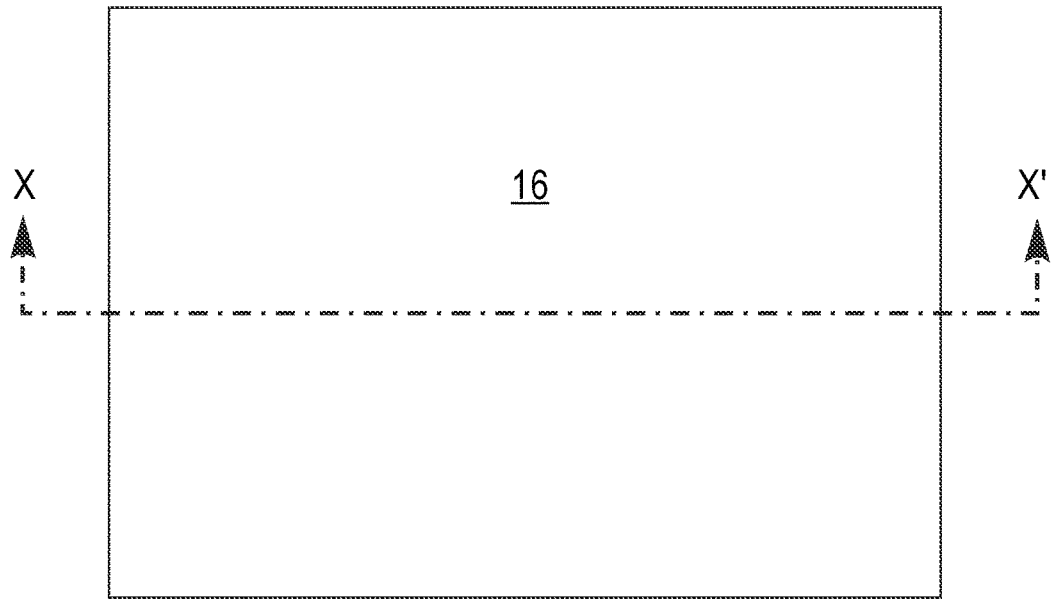
FIG. 6A is a top down view of the exemplary semiconductor structure of FIGS. 5A-5B after forming an oxide capping layer on an exposed topmost surface of each of the first oxide end portion and the second oxide end portion, on an exposed topmost surface of the waveguide core material portion, and laterally adjacent the second pair of parallel sidewall surfaces of the waveguide core material portion.
Figure 6B:
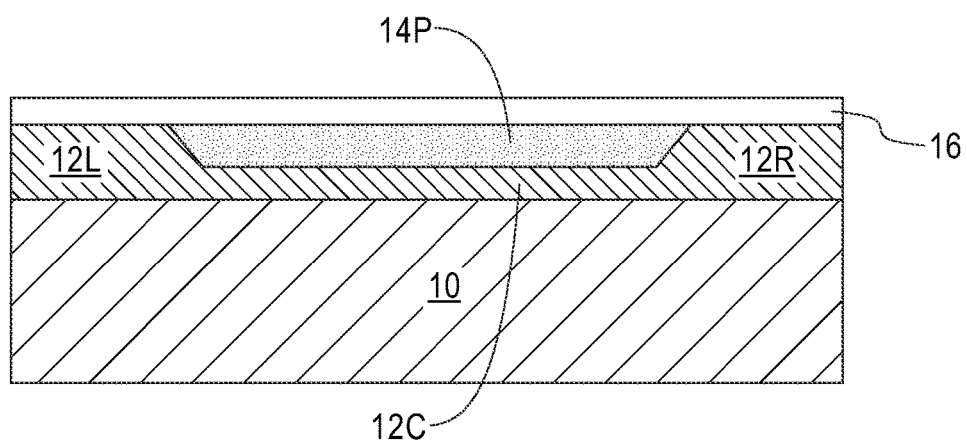
FIG. 6B is a cross sectional view of the exemplary semiconductor structure of FIG. 6A along vertical plane X-X'.

Referring now to FIGS. 6A-6B, there are illustrated the exemplary semiconductor structure of FIGS. 5A-5B after forming an oxide capping layer 16 on an exposed topmost surface of each of the first oxide end portion 12L and the second oxide end portion 12R, on an exposed topmost surface of the waveguide core material portion 14P, and laterally adjacent the second pair of parallel sidewall surfaces S3 of the waveguide core material portion 14P.

As is shown, the oxide capping layer 16 is a contiguous layer which covers the entirety of the structure shown in FIGS. 6A-6B. The oxide capping layer 16 may include one of the dielectric oxide-containing materials mentioned above for the contiguous oxide layer 12. In one embodiment, the oxide capping layer 16 may comprise a same dielectric oxide-containing material as the contiguous oxide layer 12. For example, both the contiguous oxide layer 12 and the oxide capping layer 16 may comprise silicon dioxide. In another embodiment, the oxide capping layer 16 comprises a different dielectric oxide-containing material than the contiguous oxide layer 12. For example, the contiguous oxide layer 12 may be comprised of a dielectric metal oxide, while the oxide capping layer 16 comprises silicon dioxide. In some embodiments, other dielectric materials with a refractive index smaller than the waveguide core material can be used instead of a dielectric oxide-containing material.

Collectively, the oxide capping layer 16 and the base oxide structure including the first and second oxide end portions 12L, 12R and the middle oxide portion 12C can be referred to a dielectric oxide-containing cladding structure that completely surrounds the waveguide core material portion 14P.

The oxide capping layer 16 can be formed by a deposition process including, for example, chemical vapor deposition and plasma enhanced chemical vapor deposition. In some embodiments, and following the deposition of the oxide capping layer 16, a planarization process such as, for example, chemical mechanical planarization (CMP) and/or grinding may be employed. The oxide capping layer 16 has a thickness from 1 μm to 2.0 μm. The thickness of the oxide capping layer 16 depends on the wavelength being used and the confinement of light in the waveguide core material.

Figure 7A:
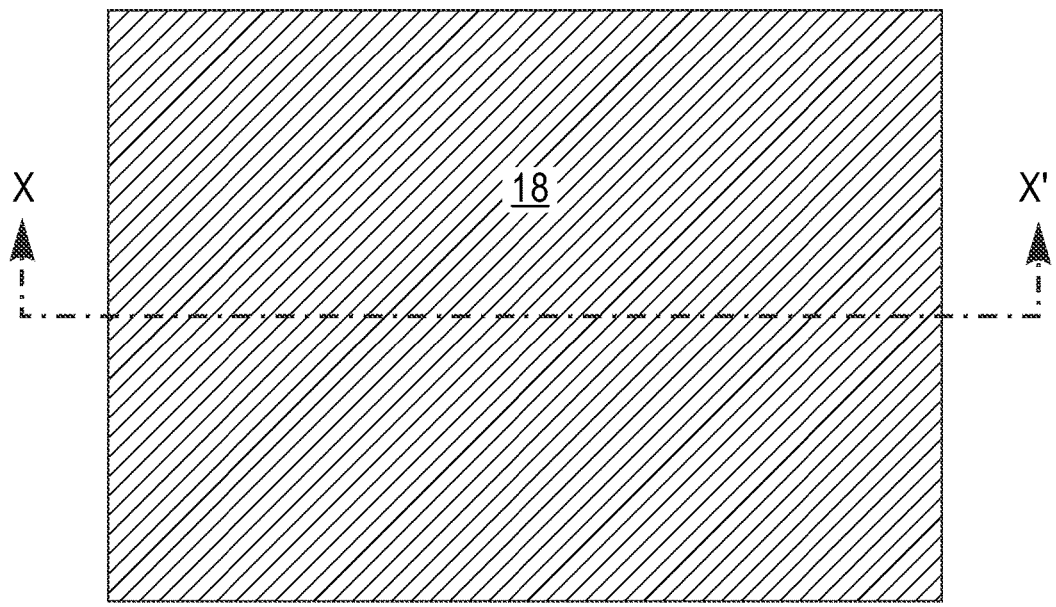
FIG. 7A is a top down view of the exemplary semiconductor structure of FIGS. 6A-6B after formation of a semiconductor material layer on an exposed topmost surface of the oxide capping layer.
Figure 7B:
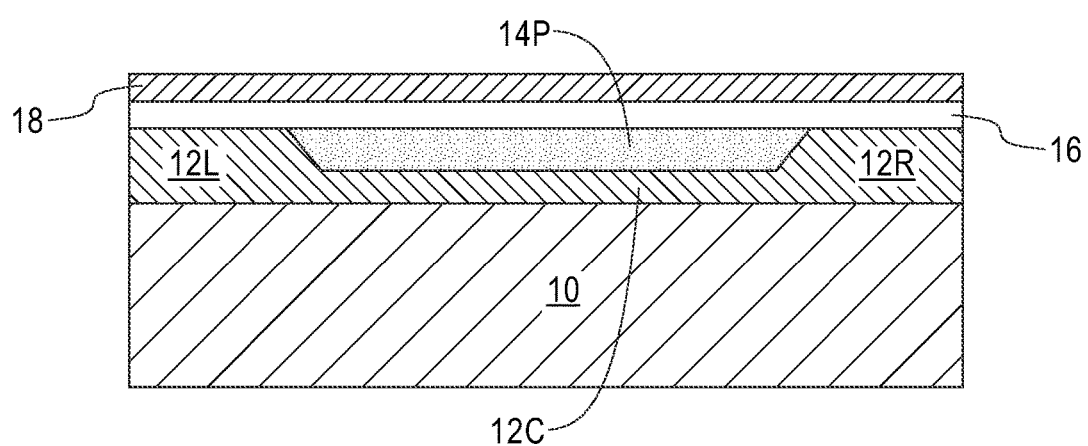
FIG. 7B is a cross sectional view of the exemplary semiconductor structure of FIG. 7A along vertical plane X-X'.

Referring now to, FIGS. 7A-7B, there are illustrated the exemplary semiconductor structure of FIGS. 6A-6B after formation of a semiconductor material layer 18 on an exposed topmost surface of the oxide capping layer 16.

The semiconductor material layer 18 may include one of the semiconductor materials as mentioned above for the semiconductor handle substrate 10. In one embodiment, the semiconductor material layer 18 may comprise a same semiconductor material as the semiconductor handle substrate 10. For example, both the semiconductor handle substrate 10 and the semiconductor material layer 18 may comprise single crystalline silicon. In another embodiment, the semiconductor material layer 18 comprises a different semiconductor material than the semiconductor handle substrate 10. For example, the semiconductor handle substrate 10 may be comprised of single crystalline silicon, while the semiconductor material layer 18 may be comprised of an III-V compound semiconductor or an II-VI compound semiconductor.

In some embodiments, the semiconductor material layer 18 comprises a single layer of semiconductor material. In other embodiments, the semiconductor material layer 18 can be comprised of two or more semiconductor materials.

In one embodiment, at least a topmost surface of the semiconductor material layer 18 can be comprised of a single crystalline semiconductor material. In other embodiments, at least the topmost surface of the semiconductor material layer 18 can be comprised of a polycrystalline or an amorphous semiconductor material. The crystal orientation of the semiconductor material layer 18 may be {100}, {110}, or {111}. Other crystallographic orientations besides those specifically mentioned can also be used in the present application.

The semiconductor material layer 18 can be formed on the exposed topmost surface of oxide capping layer 16 by bonding. In one embodiment of the present application, the semiconductor material layer 18 is directly bonded to the exposed topmost surface of oxide capping layer 16 without the need of any intermediate layer or adhesive layer. In another embodiment (not shown), an intermediate layer such as a dielectric material, or an adhesive layer can be used.

In one embodiment of the present application, a direct bonding process can be employed. In a direct bonding process, the bonding can be achieved by bringing a surface of the semiconductor material layer 18 into direct physical contact with the exposed topmost surface of the oxide capping layer 16. The two structures are then heated to a temperature from 400° to 1000° C. in an inert ambient such as, for example, He, Ne, Ar and mixtures thereof. During the heating step, an externally applied force may be applied to the two structures to ensure sufficient mating between the semiconductor material layer 18 and the oxide capping layer 16.

In some embodiments, the semiconductor material layer 18 may include a transfer substrate which can be removed after the bonding process utilizing techniques well known to those skilled in the art.

Figure 8:
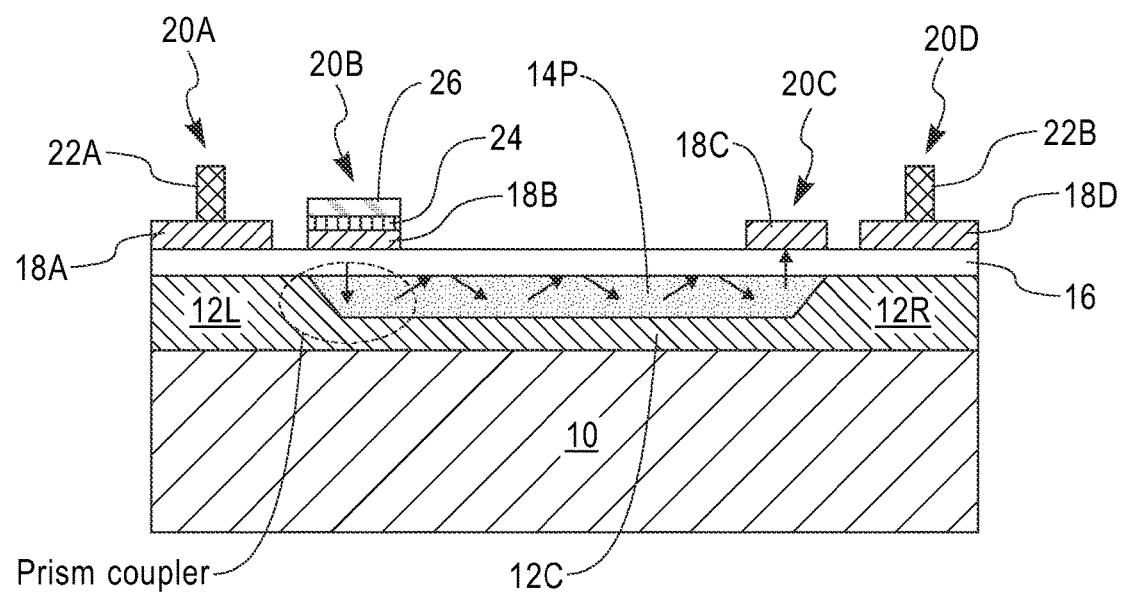
FIG. 8 is a cross sectional view of the exemplary semiconductor of FIGS. 7A-7B after forming a plurality of semiconductor devices using various portions of the semiconductor material layer as a substrate or component of each of the semiconductor devices.

Referring now to FIG. 8, there is illustrated the exemplary semiconductor of FIGS. 7A-7B after forming a plurality of semiconductor devices using various portions of the semiconductor material layer 18 as a substrate or a component of each of the semiconductor devices. The various semiconductor devices can be formed in any order utilizing techniques that are well known to those skilled in the art.

In one embodiment and as illustrated, the plurality of semiconductor devices comprises a laser diode 20B located above the sidewall surface S1 of the first oxide end portion 12L that is configured to receive and transmit light, a diode detector 20C located above the sidewall surface S1 of the second oxide end portion 12R that is configured to receive and transmit light, a first metal oxide transistor 20A located laterally adjacent the laser diode 20B and above the first oxide end portion 12L, and a second metal oxide transistor 20D located laterally adjacent the diode detector 20C and above the second oxide end portion 12R.

In one embodiment, the first metal oxide transistor 20A and the second metal oxide transistor 20D may be of a same conductivity type (i.e., n-type or p-type). In another embodiment of the present application, the first metal oxide transistor 20A and the second metal oxide transistor 20D may be of a different conductivity type. The first metal oxide transistor 20A and the second metal oxide transistor 20D include a gate structure 22A, 22B. The gate structure 22A, 22B includes, from bottom to top, a gate dielectric portion (not shown) and a gate electrode portion (also not shown). The gate structure 22A, 22B can be formed utilizing a gate first process or a gate last process. The processing details for a gate first process or a gate last process are well known to those skilled in the art and, as such, they are not provided herein so as not to obscure the present application. In the present application, element 18A denotes a semiconductor material layer portion (i.e., a first remaining portion of semiconductor material layer 18) for the first metal oxide transistor 20A and element 18D denotes a semiconductor material layer portion (i.e., a second remaining portion of semiconductor material layer 18), for the second metal oxide transistor 20D.

The gate dielectric portion of each gate structure 22A, 22B can be composed of a semiconductor oxide, a semiconductor nitride, and/or a semiconductor oxynitride. In one example, the gate dielectric portion of each gate structure 22A, 22B can be composed of silicon dioxide, silicon nitride and/or silicon oxynitride. In another embodiment of the present application, the gate dielectric portion of each gate structure 22A, 22B may include at least a dielectric metal oxide. Exemplary dielectric metal oxides that can be used as gate dielectric portion include, but are not limited to, $HfO_2$, $ZrO_2$, $La_2O_3$, $Al_2O_3$, $TiO_2$, $SrTiO_3$, $LaAlO_3$, $Y_2O_3$, $HfO_xN_y$, $ZrO_xN_y$, $La_2O_xN_y$, $Al_2O_xN_y$, $TiO_xN_y$, $SrTiO_xN_y$, $LaAlO_xN_y$, $Y_2O_xN_y$, $SiON$, $SiN_x$, a silicate thereof, and an alloy thereof. Each value of x is independently from 0.5 to 3 and each value of y is independently from 0 to 2. In some embodiments, a multilayered gate dielectric structure comprising different gate dielectric materials, e.g., silicon dioxide, and a dielectric metal oxide can be formed and used as the gate dielectric portion of each gate structure 22A, 22B.

In some embodiments of the present application, the gate dielectric portion of each gate structure 22A, 22B can be formed by a deposition technique such as, for example, chemical vapor deposition (CVD), plasma enhanced chemical vapor deposition (PECVD), physical vapor deposition (PVD), sputtering, or atomic layer deposition. In another embodiment of the present application, the gate dielectric portion of each gate structure 22A, 22B can be formed by a thermal growth technique such as, for example, thermal oxidation and/or thermal nitridation. In yet a further embodiment of the present application, a combination of a deposition process and thermal growth may be used in forming a multilayered gate dielectric structure.

The gate conductor portion of each gate structure 22A, 22B that can be used in the present application can be composed of doped polysilicon, doped silicon germanium, an elemental metal (e.g., tungsten, titanium, tantalum, aluminum, nickel, ruthenium, palladium and platinum), an alloy of at least two elemental metals, an elemental metal nitride (e.g., tungsten nitride, aluminum nitride, and titanium nitride), or multilayered combinations thereof. In one embodiment, an entirety of the gate conductor portion of each gate structure 22A, 22B is comprised of a doped polysilicon or doped polysilicon germanium. In another embodiment, a lower portion of the gate conductor portion of each gate structure 22A, 22B is comprised a conductive material other than doped polysilicon or doped polysilicon germanium, and an upper portion of the gate conductor portion of each gate structure 22A, 22B is comprised of doped polysilicon or doped silicon germanium.

The gate conductor portion of each gate structure 22A, 22B can be formed utilizing a deposition process including, for example, chemical vapor deposition (CVD), plasma enhanced chemical vapor deposition (PECVD), physical vapor deposition (PVD), sputtering, atomic layer deposition (ALD) or other like deposition processes.

Laser diode 20B is an electrically pumped semiconductor laser which consists of a third remaining portion 18B of the semiconductor material layer 18 which is doped to provide a semiconductor material of a first conductivity type, an intrinsic semiconductor material 24 and another semiconductor material 26 of a second conductivity type that is different from the first conductivity type. In one embodiment of the present application, the intrinsic semiconductor material 24 and/or the another semiconductor material 26 is(are) composed of a same semiconductor material as that of the third remaining portion 18B of semiconductor material layer 18. In another embodiment of the present application, the intrinsic semiconductor material 24 and/or the another semiconductor material 26 is(are) composed of a different semiconductor material as that of the third remaining portion 18B of semiconductor material layer 18. The dopants that provide the first and second conductivity type can be introduced into during the formation of the particular semiconductor material or after formation of a particular semiconductor material utilizing one of ion implantation and gas phase doping.

In some embodiments, the intrinsic semiconductor material 24 may have an epitaxial relationship with the third remaining portion 18B of semiconductor material layer 18, and the another semiconductor material 26 may have an epitaxial relationship with the intrinsic semiconductor material 24. In such an embodiment, an epitaxial growth process can be used in forming each of the intrinsic semiconductor material 24 and the another semiconductor material 26.

In another embodiment, the intrinsic semiconductor material 24 may have an epitaxial relationship with the third remaining portion 18B of semiconductor material layer 18, but the another semiconductor material 26 does not have an epitaxial relationship with the intrinsic semiconductor material 24. In such an embodiment, an epitaxial growth process can be used in forming the intrinsic semiconductor material 24, while the another semiconductor material 26 is formed by a deposition process other than an epitaxial deposition process.

In yet another embodiment, the intrinsic semiconductor material 24 does not have an epitaxial relationship with the third remaining portion 18B of semiconductor material layer 18, but the another semiconductor material 26 does have an epitaxial relationship with the intrinsic semiconductor material 24. In such an embodiment, an epitaxial growth process can be used in forming the another semiconductor material 26, while the intrinsic semiconductor material 24 is formed by a deposition process other than an epitaxial deposition process.

The diode detector 20C includes a fourth remaining portion 18C of the semiconductor material layer 18. The detector can be a p-i-n diode or other detector such as metal Schottky diode. For the sake of clarity only the fourth remaining portion 18C is shown in the drawings to represent the entire diode detector. The material of the detector/diode depends on what wavelength that needs to be detected and the efficiency of the detection.

In the embodiment illustrated in FIG. 8, the laser diode 20B generates a beam of light (shown by the arrows) which is reflected into the waveguide core material portion 14P by the sidewall surface S1 of the first oxide end portion 12L. The sidewall surface S1 of the first oxide end portion 12L serves as a prism coupler. The beam of light is confined by the waveguide core material portion 14P and passes through the entire length of the waveguide core material portion 14P until it is reflected at the sidewall surface S1 of the second oxide end portion 12R. The light beam reflected by the sidewall surface S1 of the second oxide end portion 12R is directed to the diode detector 20C. The diode detector 20C receives the light and coverts the light into an electrical signal. The electrical signal from the diode detector 20C can then be used to drive digital or analog circuit such as a gate of the CMOS (i.e., 20A, 20D) or other digital circuitry.

While the present application has been particularly shown and described with respect to various embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed as new is:

1. A semiconductor structure comprising:
   an optical interconnect located on a surface of a semiconductor handle substrate, said optical interconnect comprises:
   a base oxide structure containing a first oxide end portion of a first thickness, a second oxide end portion of said first thickness and a middle oxide portion of a second thickness that is less than said first thickness and connecting said first oxide end portion to said second oxide end portion, wherein each of said first oxide end portion and said second oxide end portion has a sidewall surface that is configured to receive and transmit light;
   a waveguide core material entirely embedded in said base oxide structure and having a first pair of parallel sidewall surfaces and a second pair of parallel sidewall surfaces that lie perpendicular to said first pair of parallel sidewall surfaces, wherein one of said first pair of parallel sidewall surfaces of said waveguide core material is in direct physical contact with said sidewall surface of said first oxide end portion that is configured to receive and transmit light, and said other of said first pair of parallel sidewall surfaces of said waveguide core material is in direct physical contact with said sidewall surface of said second oxide end portion that is configured to receive and transmit light, and wherein a topmost surface of said waveguide core material is coplanar with a topmost surface of each of said first oxide end portion and said second oxide end portion; and
   an oxide capping layer located directly on, and in physical contact with, said topmost surface of each of said first oxide end portion and said second oxide end portion, and located directly on, and in physical contact with, said topmost surface of said waveguide core material, and said oxide capping layer is laterally adjacent said second pair of parallel sidewall surfaces of said waveguide core material; and
   a plurality of semiconductor devices located above a topmost surface of said oxide capping layer of said optical interconnect.

2. The semiconductor structure of claim 1, wherein said semiconductor handle substrate comprises a bulk semiconductor material.

3. The semiconductor structure of claim 2, wherein said bulk semiconductor material comprises single crystalline silicon.

4. The semiconductor structure of claim 1, wherein said first oxide end portion, said second oxide end portion, and said middle oxide portion of said base oxide structure are of unitary construction and comprise a same dielectric oxide-containing material.

5. The semiconductor structure of claim 4, wherein said dielectric oxide-containing material is silicon dioxide.

6. The semiconductor structure of claim 1, wherein said sidewall surfaces of said first oxide end portion and said second oxide end portion that are configured to receive and transmit light have an angle that is less than 90°.

7. The semiconductor structure of claim 6, wherein said angle of said sidewall surfaces of said first oxide end portion and said second oxide end portion that are configured to receive and transmit light is from 40° to 80°.

8. The semiconductor structure of claim 1, wherein said waveguide core material has a higher reflective index than said first oxide end portion and said second oxide end portion of said base oxide structure.

9. The semiconductor structure of claim 8, wherein said waveguide core material is selected from amorphous silicon and silicon nitride.

10. The semiconductor structure of claim 1, wherein said oxide capping layer comprises a same dielectric oxide-containing material as said oxide base structure.

11. The semiconductor structure of claim 1, wherein said oxide capping layer directly contacts a topmost surface of an exposed portion of said middle oxide portion of said oxide base structure.

12. The semiconductor structure of claim 1, wherein said plurality of semiconductor devices comprises:
  a laser diode located above said sidewall surface of said first oxide end portion that is configured to receive and transmit light;
  a diode detector located above said sidewall surface of said second oxide end portion that is configured to receive and transmit light;
  a first metal oxide transistor located laterally adjacent said laser diode and above said first oxide end portion; and
  a second metal oxide transistor located laterally adjacent said diode detector and above said second oxide end portion.

13. The semiconductor structure of claim 12, wherein each semiconductor device of said plurality of semiconductor devices is located on a semiconductor material layer portion that is located directly on said topmost surface of the oxide capping layer of the optical interconnect.

14. A method of forming a semiconductor structure, said method comprising:
  providing a base oxide structure on a topmost surface of a semiconductor handle substrate, said base oxide structure comprising a first oxide end portion of a first thickness, a second oxide end portion of said first thickness and a middle oxide portion of a second thickness that is less than said first thickness and connecting said first oxide end portion to said second oxide end portion, wherein each of said first oxide end portion and said second oxide end portion has a sidewall surface that is configured to receive and transmit light;
  forming a waveguide core material on said middle oxide portion of said base oxide structure and entirely embedded in said base oxide structure, said waveguide core material having a first pair of parallel sidewall surfaces and a second pair of parallel sidewall surfaces that lie perpendicular to said first pair of parallel sidewall surfaces, wherein one of said first pair of parallel sidewall surfaces of said waveguide core material is in direct physical contact with said sidewall surface of said first oxide end portion that is configured to receive and transmit light, and said other of said first pair of parallel sidewall surfaces of said waveguide core material is in direct physical contact with said sidewall surface of said second oxide end portion that is configured to receive and transmit light, and wherein a topmost surface of said waveguide core material is coplanar with a topmost surface of each of said first oxide end portion and said second oxide end portion; and
  forming an oxide capping layer directly on, and in physical contact with, said topmost surface of each of said first oxide end portion and said second oxide end portion, and directly on, and in physical contact with, said topmost surface of said waveguide core material, and wherein said oxide capping layer is laterally adjacent said second pair of parallel sidewall surfaces of said waveguide core material.

15. The method of claim 14, wherein said providing said base oxide structure on said topmost surface of said semiconductor handle substrate comprises:
  forming a contiguous oxide layer on said topmost surface of said base substrate; and
  patterning said contiguous oxide layer by lithography and etching.

16. The method of claim 14, wherein said forming said waveguide core material on said middle oxide portion of said base oxide structure comprises:
  providing a waveguide core material layer on said middle oxide portion of said base oxide structure, said waveguide core material layer having a topmost surface that is coplanar with a topmost surface of each of said first oxide end portion and said second oxide end portion; and
  patterning said waveguide core material layer by lithography and etching to provide said waveguide core material.

17. The method of claim 14, wherein an angle of said sidewall surfaces of said first oxide end portion and said second oxide end portion that are configured to receive and transmit light is from 40° to 80°.

18. The method of claim 14, further comprising bonding a semiconductor material layer to a topmost surface of said oxide capping layer.

19. The method of claim 18, further comprising forming a plurality of semiconductor devices utilizing a semiconductor material portion of said semiconductor material layer as a substrate or a component of each semiconductor device.

20. The method of claim 19, wherein said forming said plurality of semiconductor devices, includes forming, in any order, a laser diode above said sidewall surface of said first oxide end portion that is configured to receive and transmit light, a diode detector above said sidewall surface of said second oxide end portion that is configured to receive and transmit light, a first metal oxide transistor laterally adjacent said laser diode and above said first oxide end portion, and a second metal oxide transistor laterally adjacent said diode detector and above said second oxide end portion.

* * * * *